United States Patent
Yamamoto et al.

(10) Patent No.: US 6,764,608 B2
(45) Date of Patent: Jul. 20, 2004

(54) FINE SPINEL-TYPE FERRIMAGNETIC PARTICLES CONTAINING FE-CO-NI AND PROCESS FOR PRODUCING THE SAME

(75) Inventors: Hiroshi Yamamoto, Tokyo (JP); Yukihiro Nissato, Tochigi-ken (JP)

(73) Assignee: Meiji University Legal Person, Tokyo (JP)

(*) Notice: Subject to any disclaimer, the term of this patent is extended or adjusted under 35 U.S.C. 154(b) by 3 days.

(21) Appl. No.: 10/353,072

(22) Filed: Jan. 29, 2003

(65) Prior Publication Data

US 2003/0183800 A1 Oct. 2, 2003

(30) Foreign Application Priority Data

Jan. 31, 2002 (JP) .................................. 2002-024239
Feb. 20, 2002 (JP) .................................. 2002-042827

(51) Int. Cl.⁷ .............................................. H01L 1/34
(52) U.S. Cl. .................................. 252/62.56; 252/62.54
(58) Field of Search ............................ 252/62.56, 62.54

(56) References Cited

U.S. PATENT DOCUMENTS 3,020,426 A * 2/1962 Der Burgt ................... 310/26
3,078,234 A * 2/1963 Davis, Jr. ................ 252/62.56
3,822,210 A   7/1974 Iwase et al.
4,664,831 A   5/1987 Hibst et al.

FOREIGN PATENT DOCUMENTS

JP          7-267645       10/1995

OTHER PUBLICATIONS

Kaczmarek et al 8108 IEEE Transactions on Magnetics 29 (1993) Nov., No. 6,Magnetic Properties of Aerosol Synthesized Co–substituted Spinel Ferrites.

* cited by examiner

*Primary Examiner*—C. Melissa Koslow
(74) *Attorney, Agent, or Firm*—Nixon & Vanderhye P.C.

(57) ABSTRACT

Fine spinel-type ferrimagnetic particles of the present invention have a composition represented by the formula (I):

$$(CoO)_x(NiO)_y \cdot n/2 Fe_2O_3 \qquad (I)$$

wherein $2.0 < n = Fe/(Co+Ni) < 3.0$, $0.4 \leq x \leq 0.9$, $0.1 \leq y \leq 0.6$ and $x+y=1$. The fine spinel-type ferrimagnetic particles exhibit a high coercive force in spite of fine particles.

13 Claims, 10 Drawing Sheets

FINE SPINEL-TYPE FERRIMAGNETIC PARTICLES CONTAINING FE-CO-NI AND PROCESS FOR PRODUCING THE SAME

BACKGROUND OF THE INVENTION

The present invention relates to fine spinel-type ferrimagnetic particles containing Fe, Co and Ni, and a process for producing the same. More particularly, the present invention relates to fine spinel-type ferrimagnetic particles containing Fe, Co and Ni, which can exhibit a high coercive force in spite of fine particles, and a process for producing the fine spinel-type ferrimagnetic particles in an aqueous solution at a temperature of not more than 101° C.

Conventionally, as magnetic materials used in recording media such as data-filing tapes, there has been proposed spinel-type ferrite in the form of an iron-containing composite oxide. The spinel-type ferrite has various compositions represented by the formula: $MFe_2O_4$, wherein M is $Fe^{(II)}$, Co, Ni, Mn, Al, Cu, Zn or the like. The spinel-type ferrite includes, for example, Co ferrite. The Co ferrite has a large crystal magnetic anisotropy constant and, therefore, is unlikely to form superparamagnetic particles in spite of finer particles. As a result, the Co ferrite can maintain good magnetic properties, so that it has been expected to apply the Co ferrite to high-density magnetic recording materials. The Co ferrite is formed into a thin film by a spin-spray ferrite plating method.

As magnetic materials having more excellent magnetic properties, there are known Co-Ni ferrite thin films (Cho and other two persons, "Effects of Addition of Ni to Co Ferrite Thin Film", "Powder and Powder Metallurgy", Feb. 25, 2000, Vol. 47, No. 2, pp. 171–174).

The above Co-Ni-based spinel ferrite is a ferrimagnetic material, and is used in the form of a bulky mass or a thin film. However, since the Co-Ni-based spinel ferrite has a coercive force as low as less than 239 kA/m (3,000 Oe), it may be difficult to produce recording media having high-recording density, by using such a magnetic material. Namely, although the Co-Ni-based spinel ferrite is applicable to tape-shaped recording media, there arises such a problem that the recording media are no longer improved in performance thereof since the coercive force of the Co-Ni-based spinel ferrite cannot be further enhanced.

On the other hand, magnetoplumbite-type ferrite (M-type ferrite) as magnetic material applied to recording media, e.g., Ba ferrite, has also been studied for reducing the particle size thereof. However, Ba ferrite magnetic particles having an average particle diameter of 30 nm to 40 nm, exhibit a coercive force as low as less than 239 kA/m (3,000 Oe).

That is, since the conventional magnetic materials have failed to be further improved in coercive force, it may be difficult to obtain recording media having a higher recording density by using such magnetic materials.

As a result of the present inventors' earnest studies for solving the above problems, it has been found that by mixing aqueous solutions containing $Fe^{3+}$, $Co^{2+}$ and $Ni^{2+}$, respectively, which are prepared by dissolving water-soluble salts of iron, cobalt and nickel in water, at a predetermined molar ratio; while stirring the resultant mixed solution, adding thereto an aqueous alkali solution in an amount of not less than one equivalent based on whole metal ions contained in the mixed solution such that the concentration of OH groups contained in a solution obtained after adding the aqueous alkali solution is not more than 3 mol/liter; and heating the resultant precipitated slurry under stirring at a temperature of 80 to about 101°., the thus obtained fine spinel-type ferrimagnetic particles are a magnetic material capable of exhibiting not only a high coercive force in spite of fine particles, but also such very excellent magnetic properties that a rotational hysteresis integration value thereof relating to rotational hysteresis loss and magnetization mechanism are close to Fanning Model. The present invention has been attained on the basis of this finding.

SUMMARY OF THE INVENTION

An object of the present invention is to provide fine spinel-type ferrimagnetic particles useful as a high-density magnetic recording material capable of exhibiting not only a high coercive force in spite of fine particles but also a rotational hysteresis integration value relating to rotational hysteresis loss and magnetization mechanism which is close to Fanning Model.

Another object of the present invention is to provide a process for producing fine spinel-type ferrimagnetic particles of a single-phase structure, which are capable of exhibiting a high coercive force in spite of fine particles, in an aqueous solution at a temperature of 80 to about 101° C. using a simple apparatus.

To accomplish with the aims, in a first aspect of the present invention, there are provided fine spinel-type ferrimagnetic particles having a composition represented by the formula (I):

$$(CoO)_x(NiO)_y \cdot n/2 Fe_2O_3 \qquad (I)$$

wherein $2.0 < n = Fe/(Co+Ni) < 3.0$, $0.4 \leq x \leq 0.9$ and $0.1 \leq y \leq 0.6$.

In a second aspect of the present invention, there is provided a process for producing fine spinel-type ferrimagnetic particles, comprising:

(1) mixing aqueous solutions containing $Fe^{3+}$, $Co^{2+}$ and $Ni^{2+}$ with each other, which are prepared by dissolving each of water-soluble salts of iron, cobalt and nickel in water, at such ratio of an Fe mole to the sum of a Co mole and a Ni mole being from more than 2.0 to less than 3.0 and the Co mole to the Ni mole being 0.4 to 0.9/0.6 to 0.1, (2) while stirring the resultant mixed solution, adding thereto an aqueous alkali solution in a range of from not less than one equivalent based on whole metal ion contained in the mixed solution to an amount such that the concentration of OH groups contained in a solution obtained after adding the aqueous alkali solution is not more than 3 mol/liter; and (3) heating the resultant precipitated slurry at a temperature of 80 to 101° C. while stirring.

In a third aspect the present invention, there are provided Fine spinel-type ferrimagnetic particles having a composition represented by the formula (I):

$$(CoO)_x(NiO)_y \cdot n/2 Fe_2O_3 \qquad (I)$$

wherein $2.0 < n = Fe/(Co+Ni) < 3.0$, $0.4 \leq x \leq 0.9$ and $0.1 \leq y \leq 0.6$ produced by a process comprising:

(1) mixing aqueous solutions containing $Fe^{3+}$, $Co^{2+}$ and $Ni^{2+}$ with each other, which are prepared by dissolving each of water-soluble salts of iron, cobalt and nickel in water, at such ratio of an Fe mole to the sum of a Co mole and a Ni mole being from more than 2.0 to less than 3.0 and the Co mole to the Ni mole being 0.4 to 0.9/0.6 to 0.1, (2) while stirring the resultant mixed solution, adding thereto an aqueous alkali solution in a range of from not less than one equivalent based on whole metal ion contained in the mixed solution to an amount such that the concentration of OH groups contained in a solution obtained after adding the aqueous alkali solution is not more than 3 mol/liter; and (3) heating the resultant precipitated slurry at a temperature of 80 to 101° C. while stirring.

In a fourth aspect the present invention, there is provided a magnetic sheet comprising a binder resin and fine spinel-type ferrimagnetic particles having a composition represented by the formula (I):

$$(CoO)_x(NiO)_y \cdot n/2Fe_2O_3 \tag{I}$$

wherein $2.0<n=Fe/(Co+Ni)<3.0$, $0.4 \leq x \leq 0.9$ and $0.1 \leq y \leq 0.6$.

In a fifth aspect the present invention, there are provided fine spinel-type ferrimagnetic particles comprising single-phase structure, comprising iron, cobalt and nickel, the ratio of an iron mole to the sum of a cobalt mole and a nickel mole being from more than 2.0 to less than 3.0, and having a particle diameter of 10 to 50 nm, a saturation magnetization σs of $50.3 \times 10^{-6}$ to $88.0 \times 10^{-6}$ Wb.m/kg and a coercive force HcJ of 239 to 637 kA/m.

BRIEF DESCRIPTION OF THE DRAWINGS

FIG. 3(a) and FIG. 3(b) are graphs showing a relationship between the molar ratio of Fe/(Co+Ni) and σ-T curve of the particles having a composition represented by the formula: $(CoO)_x(NiO)_y \cdot n/2Fe_2O_3$, wherein FIG. 3(a) represents a graph showing the relationship in the case where the molar ratio of Fe/(Co+Ni) is 2.0, and FIG. 3(b) represents a graph showing the relationship in the case where the molar ratio of Fe/(Co+Ni) is 2.5.

DETAILED DESCRIPTION OF THE INVENTION

Figure 1:
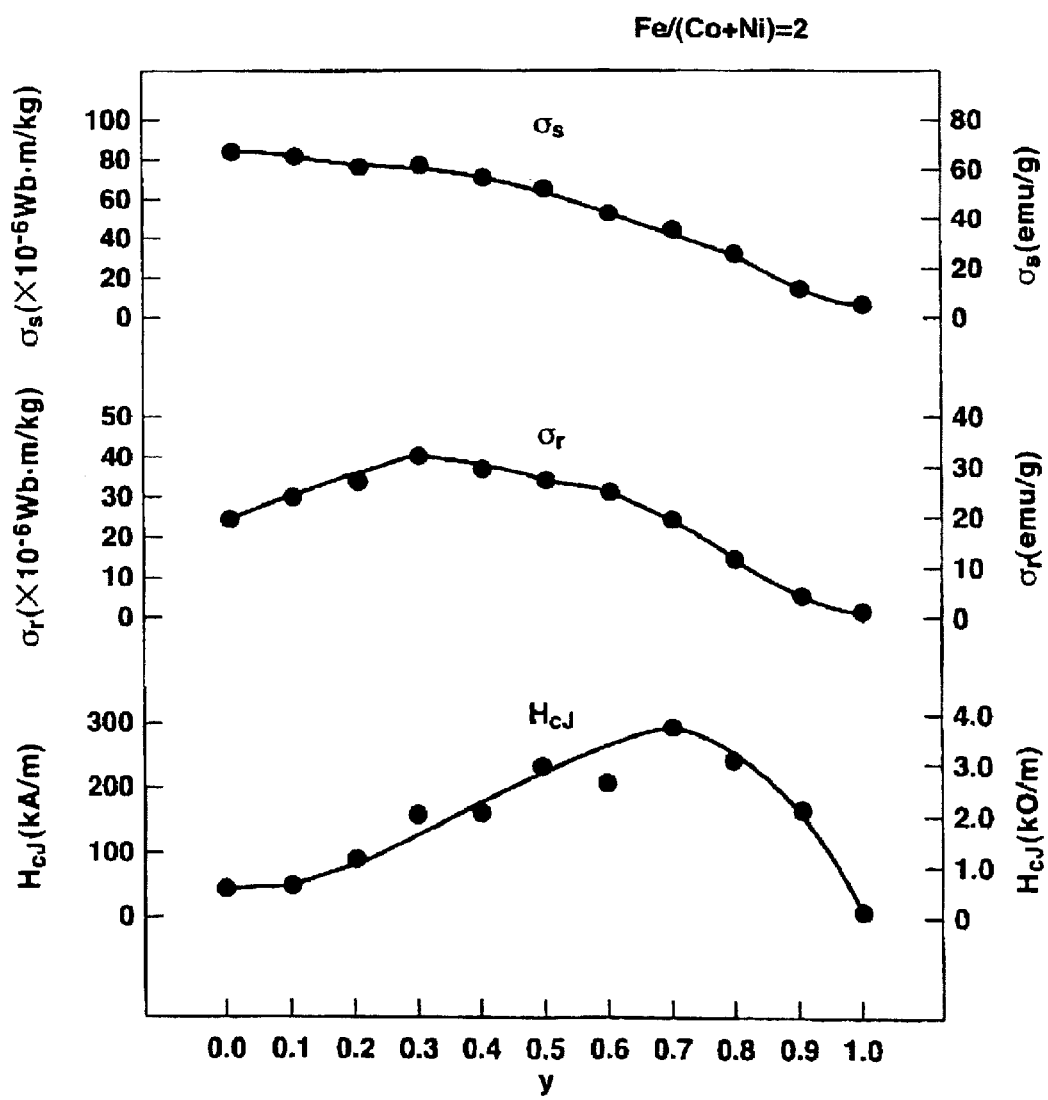
FIG. 1 is a graph showing a relationship between a compositional ratio of Ni to Co and magnetic properties of the particles having a composition represented by the formula: $(CoO)_x(NiO)_y \cdot n/2Fe_2O_3$, in the case where the molar ratio of Fe/(Co+Ni) is 2.0.

The fine spinel-type ferrimagnetic particles of the present invention have a composition represented by the formula (I):

$$(CoO)_x(NiO)_y \cdot n/2Fe_2O_3 \tag{I}$$

wherein $2.0<n=Fe/(Co+Ni)<3.0$, $0.4 \leq x \leq 0.9$ and $0.1 \leq y \leq 0.6$. Meanwhile, the composition represented by the formula (I) is contained in a composition represented by the formula represented by: $Co_{x'}Ni_{y'}Fe_2O_4$ wherein $2.0<Fe/(Co+Ni)<3.0$, $0<x'$ and $0<y'$.

When the molar ratio (n) of Fe to (Co+Ni) (n=Fe/(Co+Ni)) is from more than 2.0 to less than 3, spinel-type ferrimagnetic particles composed of single phase can be produced. However, when n=Fe/(Co+Ni) is not less than 3.0, Fe is contained in an extremely excessive amount, so that iron oxide is mixed in the obtained particles. In the case of n=Fe/(Co+Ni)=2.0, magnetic particles composed of two phases are produced. When n=Fe/(Co+Ni) is less than 2.0, the divalent metal ions, i.e., a sum of Co and Ni are contained in an excessive amount relative to Fe, so that different phases are mixed in the obtained particles.

In the consideration of further improvement in coercive force of the fine spinel-type ferrimagnetic particles, the molar ratio (n) of Fe to (Co+Ni) is preferably from not less than 2.25 to less than 3.0, more preferably 2.25 to 2.75.

In the formula (I), x is usually 0.4 to 0.9, preferably 0.45 to 0.9, more preferably 0.5 to 0.9, and y is usually 0.1 to 0.6, preferably 0.1 to 0.55, more preferably 0.1 to 0.5. A sum of x and y (x+y) is usually 1. In the consideration of further improvement in coercive force of the fine spinel-type ferrimagnetic particles, x and y are preferably 0.5, respectively.

In addition, when y is 0.1 to 0.4, namely even if Ni is contained in a small amount, the coercive force of the spinel-type ferrimagnetic particles can also be enhanced by varying the value of n=Fe/(Co+Ni), thereby not only enabling further reduction in particle diameter but also achieving low production costs.

The fine spinel-type ferrimagnetic particles have a particle diameter of usually 10 to 50 nm, preferably 20 to 40 nm. When the particle diameter is less than 10 nm, the magnetization of such particles is low, so that it may be difficult to accomplish the aims of the present invention. When the particle diameter is more than 50 nm, the particle size becomes too large, so that it may also be difficult to accomplish the aims of the present invention.

The fine spinel-type ferrimagnetic particles of the present invention have a saturation magnetization σs of usually $50.3 \times 10^{-6}$ to $88.0 \times 10^{-6}$ Wb.m/kg (40 to 70 emu/g), preferably $56.5 \times 10^{-6}$ to $88.0 \times 10^{-6}$ Wb.m/kg (45 to 70 emu/g). When the saturation magnetization as is less than $50.3 \times 10^{-6}$ Wb.m/kg (40 emu/g), the obtained particles are insufficient in magnetic properties required for magnetic material, so that it may be difficult to accomplish the aims of the present invention. Meanwhile, the conversion between the above two units for the saturation magnetization is based on the equation: $1 \text{ emu/g} = 4\pi \times 10^{-7}$ Wb.m/kg, wherein π represents a ratio of the circumference of a circle to its diameter.

The fine spinel-type ferrimagnetic particles of the present invention have a coercive force HcJ of usually not less than 239 kA/m (3,000 Oe), preferably 239 to 637 kA/m (3,000 to 8,000 Oe), more preferably 279 to 637 kA/m (3,500 to 8,000

Oe). When the coercive force HcJ is less than 239 kA/m (3,000 Oe), the obtained particles are insufficient in magnetic properties required for magnetic material, so that it may be difficult to accomplish the aims of the present invention. Meanwhile, the conversion between the above two units for the coercive force is based on the equation: 1 Oe=$10^3/4\pi$ A/m, wherein $\pi$ represents a ratio of the circumference of a circle to its diameter.

The fine spinel-type ferrimagnetic particles of the present invention are composed of a single phase. When the particles are composed of two or more phases, the obtained particles are deteriorated in magnetic properties required for magnetic material, so that it may be difficult to accomplish the aims of the present invention.

Next, the process for producing the fine spinel-type ferrimagnetic particles according to the present invention is described.

In the present invention, the fine spinel-type ferrimagnetic particles are produced by (1) mixing aqueous solutions containing $Fe^{3+}$, $Co^{2+}$ and $Ni^{2+}$ with each other, which are prepared by dissolving each of water-soluble salts of iron, cobalt and nickel in water, at such ratio of an Fe mole to the sum of a Co mole and a Ni mole being from more than 2.0 to less than 3.0 and the Co mole to the Ni mole being 0.4 to 0.9/0.6 to 0.1, i.e., at a molar ratio satisfying the above formula (I), (2) while stirring the resultant mixed solution, adding thereto an aqueous alkali solution in an amount of from not less than one equivalent based on whole metal ions contained in the mixed solution to an amount such that the concentration of OH groups contained in the resultant solution obtained after adding the aqueous alkali solution is not more than 3 mol/liter, thereby obtaining a precipitated slurry by neutralization reaction of the mixed metal salt solutions; and (3) heating the resultant precipitated slurry under stirring at a temperature of 80 to 101° C., thereby obtaining fine spinel-type ferrimagnetic particles by polycondensation reaction of metal-mixed precipitates.

Examples of the water-soluble iron salts used in the present invention may include ferric salts such as ferric chloride and ferric sulfate, or the like. Examples of the water-soluble cobalt salts used in the present invention may include cobalt chloride, cobalt sulfate or the like. Examples of the water-soluble nickel salts used in the present invention may include nickel chloride, nickel sulfate or the like.

As the alkali contained in the aqueous alkali solution, there may be used water-soluble caustic alkalis such as sodium hydroxide and aqueous ammonia.

The amount of the alkali added is a range of usually from not less than one equivalent based on whole metal ions contained the raw aqueous metal salt solutions to an amount such that the concentration of OH groups contained in the resultant solution after adding the aqueous alkali solution is not more than 3 mol/liter. As a result, the pH value of the resultant precipitated slurry produced by adding the alkali is controlled to usually 12.7 to 13.3, preferably 13.0 to 13.3. When the amount of the alkali added is less than one equivalent, metal ions may remain unreacted. When the amount of the alkali added is more than the amount such that the concentration of OH groups contained in the resultant solution after adding the aqueous alkali solution is more than 3 mol/liter, cobalt may be eluted out again.

The heating temperature of the precipitated slurry is usually 80 to 101° C., preferably 85 to 100° C. When the heating temperature is less than 80° C., $\alpha$-FeOOH may be mixed in the obtained particles. When the heating temperature is more than 101° C., it is required to use special apparatuses such as autoclave or the like.

The fine spinel-type ferrimagnetic particles produced by the above heat-treatment may be then subjected to ordinary treatments for particles such as solid/liquid separation (for example, filtration), washing, drying and pulverization.

The point of the present invention is that as a result of noticing the divalent metal ion occupying the 16 d position of Co ferrite as a ferrimagnetic material, a part of Co is replaced with Ni to allow Co and Ni to coexist therein, thereby enabling enhancement in superexchange interaction as well as improvement in coercive force.

Figure 2:
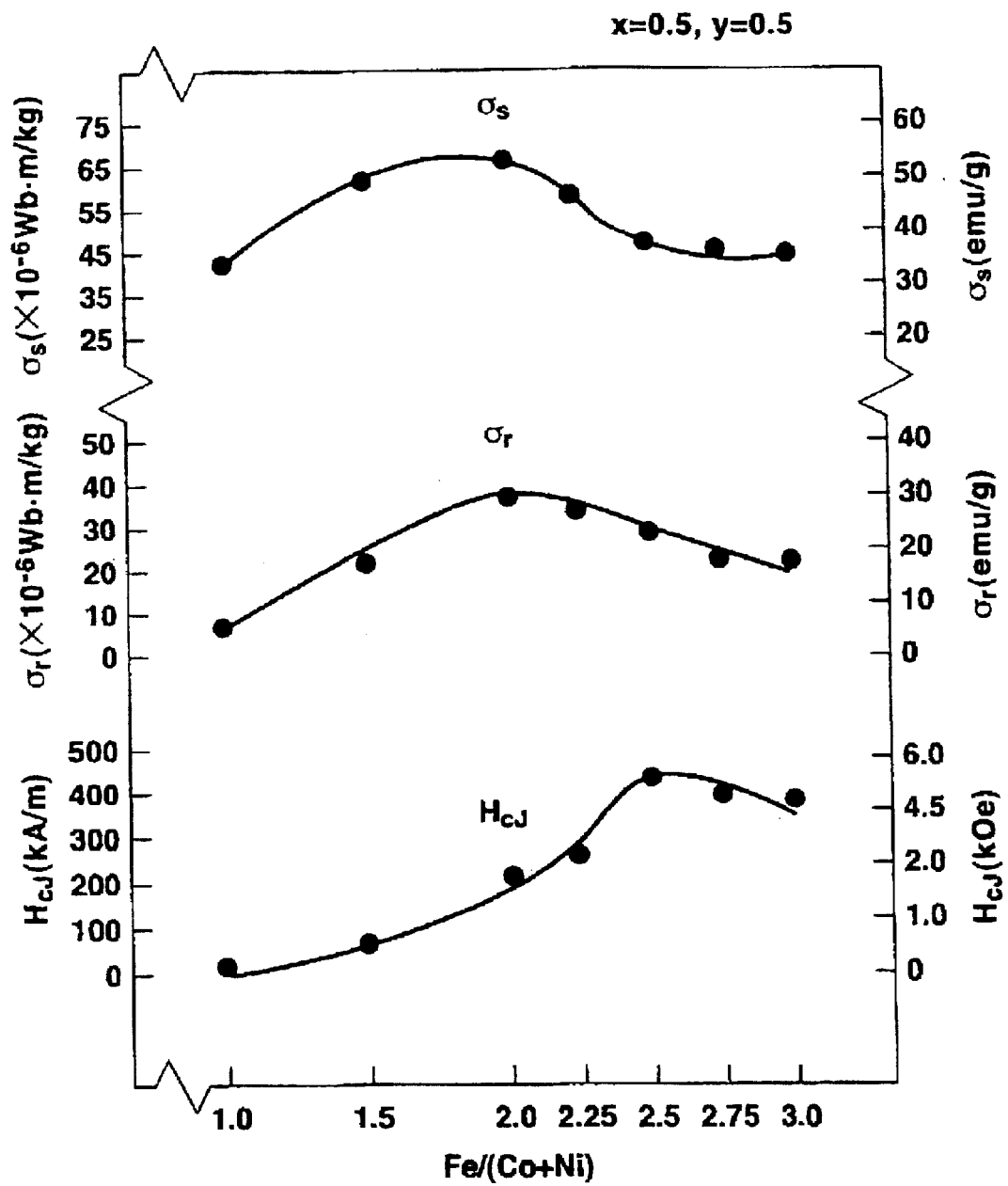
FIG. 2 is a graph showing a relationship between the molar ratio of Fe/(Co+Ni) and magnetic properties of the particles having a composition represented by the formula: $(CoO)_x(NiO)_y \cdot n/2Fe_2O_3$, in the case where x is 0.5 and y is 0.5.
Figure 3A:
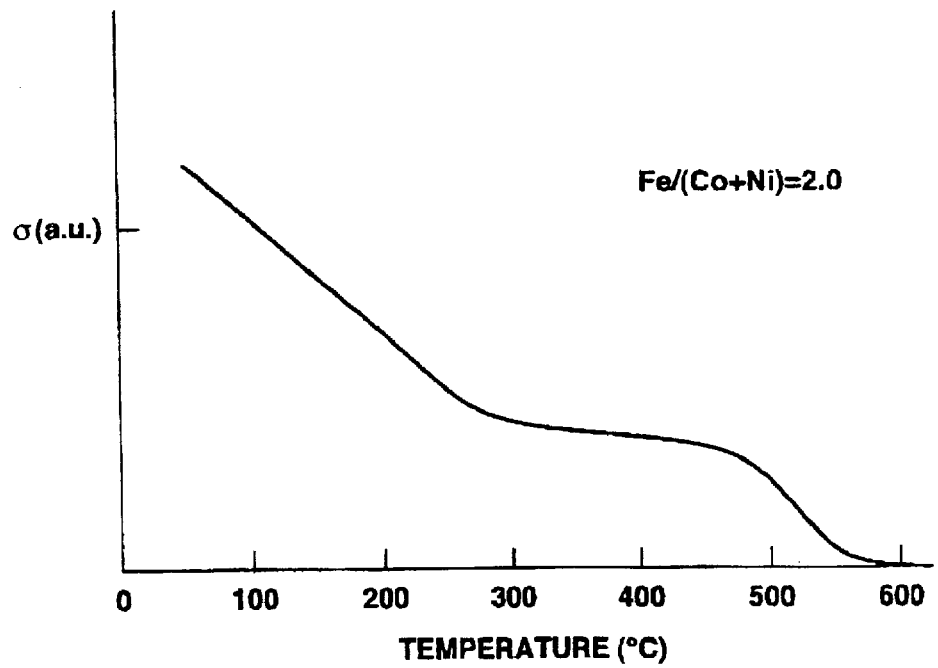
Figure 3B:
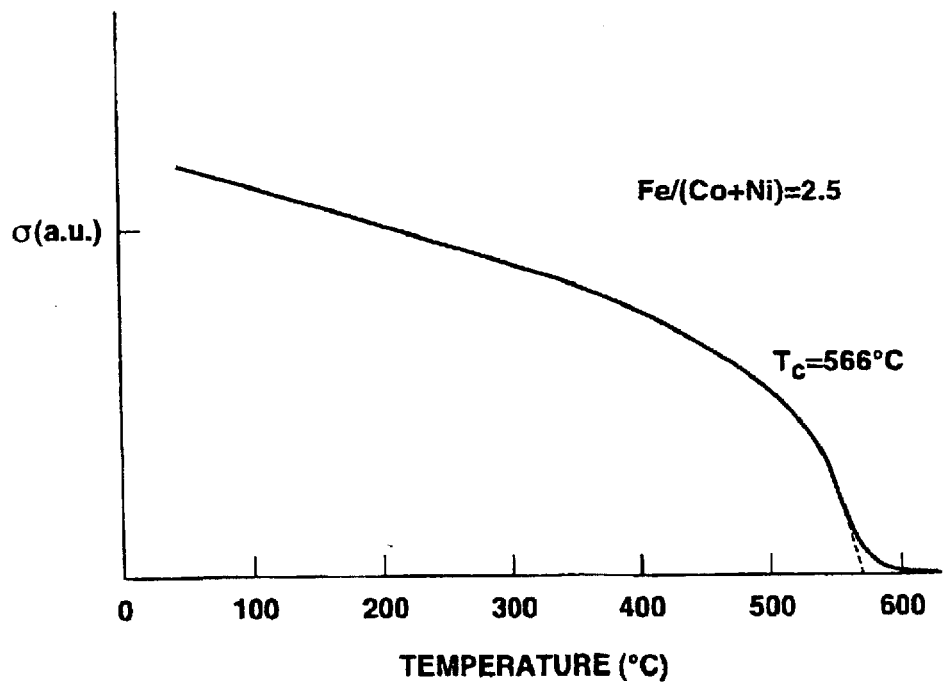

More specifically, in the production of the fine spinel-type ferrimagnetic particles having a composition represented by the formula: $(CoO)_x(NiO)_y \cdot n/2Fe_2O_3$, experiments have been conducted by changing the molar ratio of Ni to Co variously. As a result, as shown in FIG. 1, it became apparent that when the molar ratio of Ni to Co is increased, the obtained fine particles are enhanced in coercive force HcJ thereof. In addition, as shown in FIG. 2, it became apparent that when the molar ratio (n) of Fe to (Co+Ni) is increased, the obtained particles are also enhanced in coercive force HcJ thereof. Further, as a result of measuring the temperature characteristics ($\sigma$-T) of the obtained fine particles, it has been found that when the molar ratio (n) of Fe to (Co+Ni) is 2.0, fine particles composed of two phases are obtained as shown in FIG. 3(a), and when the molar ratio (n) of Fe to (Co+Ni) is 2.5 which is fallen in the range of from more than 2.0 to less than 3, fine particles composed of a single phase are obtained as shown in FIG. 3(b).

Thus, the fine magnetic particles of the present invention are fine spinel-type ferrimagnetic particles composed of a single phase structure, having a composition represented by the formula:

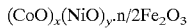

wherein $2.0<n=Fe/(Co+Ni)<3.0$, $0.4 \leq x \leq 0.9$, $0.1 \leq y \leq 0.6$ and x+y=1.

having a particle diameter of usually 10 to 50 nm, a saturation magnetization $\sigma s$ of usually $50.3 \times 10^{-6}$ to $88.0 \times 10^{-6}$ Wb.m/kg (40 to 70 emu/g) and a coercive force HcJ of usually 239 to 637 kA/m (3,000 to 8,000 Oe). In addition, the fine spinel-type ferrimagnetic particles are a magnetic material having very high magnetic properties such as high coercive force, and rotational hysteresis integration value relating to rotational hysteresis loss and magnetization mechanism, which are close to Fanning model, in spite of fine particles. Further, the fine spinel-type ferrimagnetic particles of the present invention are useful for producing digital magnetic recording media having a high recording density.

Furthermore, in the process for producing the fine spinel-type ferrimagnetic particles according to the present invention, it is possible not only to produce single-phase fine spinel-type ferrimagnetic particles in an aqueous solution at a temperature of not more than about 101° C. by chemical coprecipitation method without postannealing without using an autoclave or the like, but also to purify the obtained particles by ordinary methods such as solid/liquid separation, resulting in highly economical process.

EXAMPLES

The present invention is described in more detail by Examples and Comparative Examples, but the Examples are only illustrative and, therefore, not intended to limit the scope of the present invention thereto.

Meanwhile, the concentrations of the raw aqueous solutions as well as OH group concentrations thereof were measured by chemical analysis method.

The pH value of the reaction solution was measured by a pH meter (manufactured by Horiba Seisakusho Co., Ltd.).

The magnetic properties and Curie temperature were measured by a vibration sample magnetometer "VSM" (manufactured by Toei Kogyo Co., Ltd.).

The elemental analysis of precipitates and particles was performed using ICP (Inductivity Coupled Plasma) (manufactured by Hitachi Ltd.).

The crystal structure was measured by an X-ray diffractometer (manufactured by Rigaku Co., Ltd.).

The particle configuration was measured by a transmission electron microscope (TEM) (manufactured by Nippon Denshi Co., Ltd.).

The rotational hysteresis loss $W_r$ was measured by a torque magnetometer (manufactured by Tamagawa Seisakusho Co., Ltd.).

Example 1

Ferric chloride hexahydrate, cobalt chloride hexahydrate and nickel chloride hexahydrate as raw metal salts were respectively dissolved in pure water in a glass beaker to prepare an aqueous solution containing 0.225 mol/liter of $Fe^{3+}$, an aqueous solution containing 0.10 mol/liter of $Co^{2+}$ and an aqueous solution containing 0.10 mol/liter of $Ni^{2+}$, respectively. A two-liter flask equipped with a pH meter, a stirrer and a thermometer is charged with 400 ml of the aqueous $Fe^{3+}$ solution, 200 ml of the aqueous $Co^{2+}$ solution and 200 ml of the aqueous $Ni^{2+}$ solution to prepare 800 ml of a mixed aqueous solution having a molar ratio of Fe to (Co+Ni) of 2.25. While stirring the mixed aqueous solution, 240 ml of a 3.0 mol/liter sodium hydroxide aqueous solution was added thereto, thereby obtaining 1,040 ml of a precipitated slurry having a pH value of 13.3. A part of the resultant precipitated slurry was sampled and filtered to obtain a precipitate. As a result of elemental analysis of the obtained precipitate, it was confirmed that the Fe content was 46.95% by weight, the Co content was 11.00% by weight, and the Ni content was 11.60% by weight.

Next, the precipitated slurry was heated under stirring at 100° C. for 120 minutes, thereby obtaining black particles. The thus obtained black particles were washed with water five times at intervals of 24 hours by decantation method, and then filtered through a filter paper #2 using a nutsche. The recovered filter cake was dried at 80° C. for 12 hours using an electric oven. Then, the resultant dried product was pulverized by a mortar, thereby fine black particles.

Figure 4:
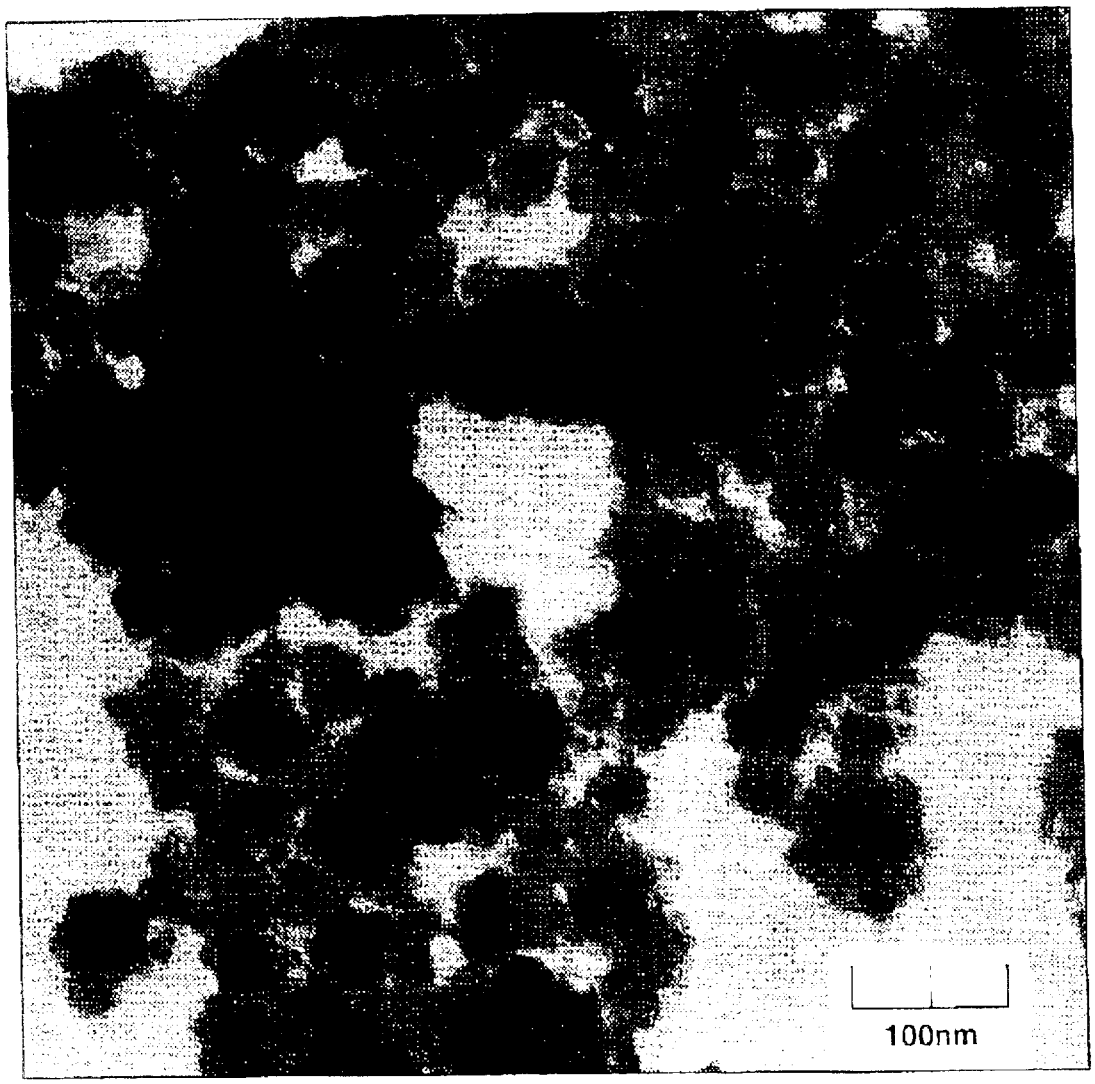
FIG. 4 is a TEM micrograph of the particles obtained in Example 1 which have a composition represented by the formula: $(CoO)_x(NiO)_y \cdot n/2Fe_2O_3$, wherein the molar ratio of Fe/(Co+Ni) is 2.25.
Figure 5:
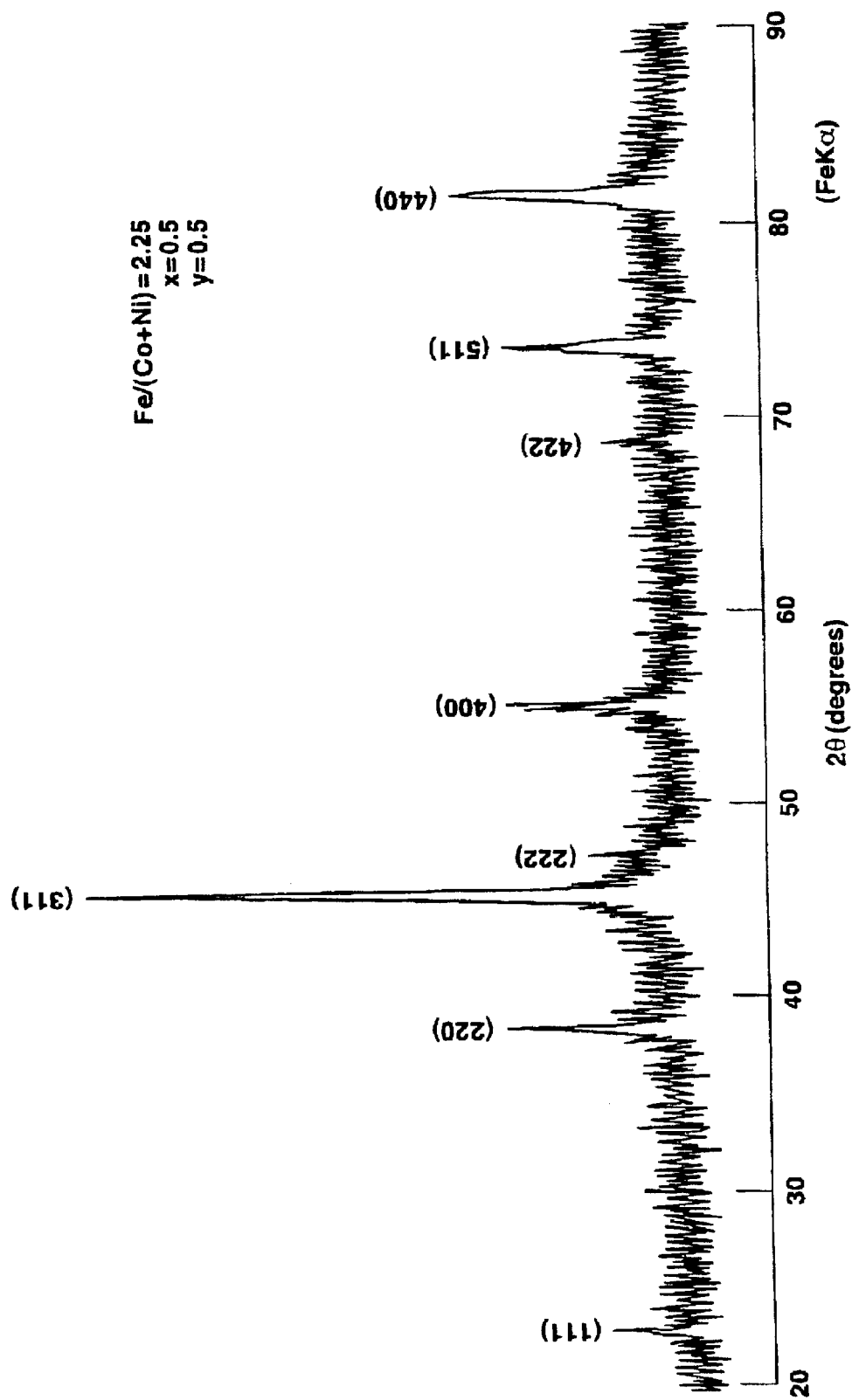
FIG. 5 is an X-ray diffraction pattern of the particles obtained in Example 1.

The TEM micrograph of the thus obtained fine black particles is shown in FIG. 4. As a result of elemental analysis of the fine black particles, it was confirmed that the particles had a composition represented by the formula: $(CoO)_{0.5}(NiO)_{0.5} \cdot 1.125Fe_2O_3$ (i.e., in the formula: $(CoO)_x(NiO)_y \cdot n/2Fe_2O_3$, n=Fe/(Co+Ni)=2.25, x=0.5 and y=0.5). In addition, as a result of X-ray diffraction analysis of the fine black particles, it was confirmed that the particles contained fine particles having a spinel crystal structure as shown in FIG. 5. Further, as a result of observing the fine black particles by a transmission electron microscope (TEM), it was confirmed that the particles were monodisperse fine particles having an average particle diameter of about 30 nm as shown in FIG. 4.

Figure 6:
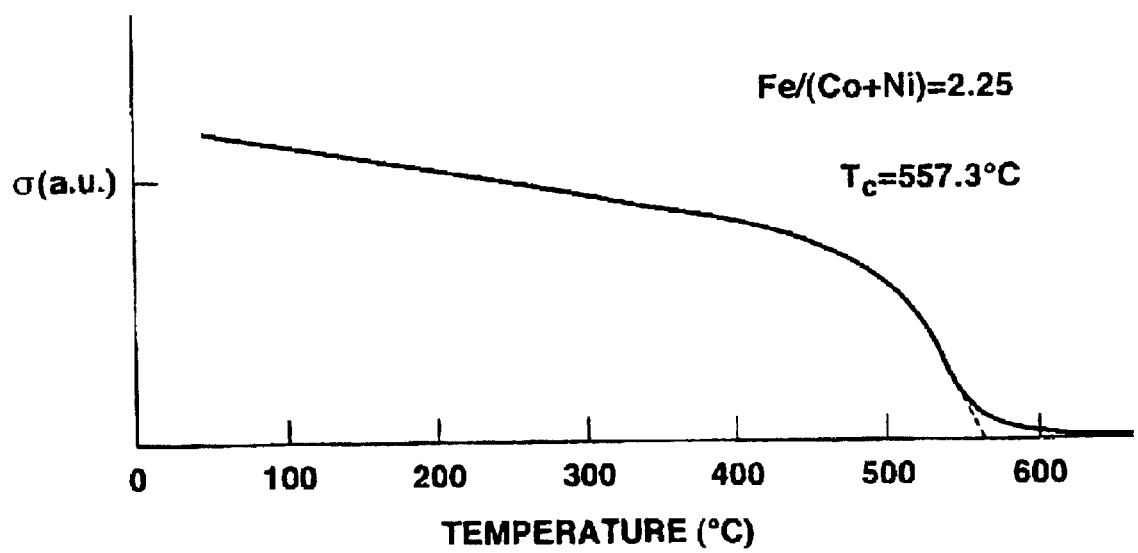
FIG. 6 is a graph showing a σ-T curve of the particles obtained in Example 1.

Further, as a result of measuring magnetic properties of the fine black particles, it was confirmed that the saturation magnetization σs thereof was $56.3 \times 10^{-6}$ Wb.m/kg (44.8 emu/g), and the coercive force HcJ thereof was 507 kA/m (6,370 Oe). In addition, it was confirmed that the obtained fine black particles are single-phase crystal ferrimagnetic particles having a Curie point of 557.3C as shown by the σ-T curve in FIG. 6.

In order to determine a rotational hysteresis loss Wr of the obtained fine black particles, the magnetic field-dependency of Wr/Js which was the value corresponding to the rotational hysteresis loss was measured using a torque magnetometer. As a result, it was confirmed that the value of Ha.ave. was 2,029 kA/m (25.5 kOe). Also, since the rotational hysteresis integration Rh relating to magnetization mechanism was 1.57, it was confirmed that magnetization model of the particles was close to Fanning Model. This indicated that the obtained fine black single-phase ferrimagnetic particles were a magnetic material having very excellent magnetic properties.

Example 2

Ferric chloride hexahydrate, cobalt chloride hexahydrate and nickel chloride hexahydrate as raw metal salts were respectively dissolved in pure water in a glass beaker to prepare 200 ml of an aqueous solution containing 0.275 mol/liter of $Fe^{3+}$, 180 ml of an aqueous solution containing 0.1 mol/liter of $Co^{2+}$ and 20 ml of an aqueous solution containing 0.1 mol/liter of $Ni^{2+}$, respectively. These aqueous solutions were charged into a 1-liter flask equipped with a pH meter, a stirrer and a thermometer to prepare 400 ml of a mixed aqueous solution having a molar ratio (n) of Fe to (Co+Ni) of 2.75. While stirring the mixed aqueous solution, 250 ml of a 3.0 mol/liter sodium hydroxide aqueous solution was added thereto, thereby obtaining 650 ml of a precipitated slurry having a pH value of 13.3.

Next, the obtained precipitated slurry was heated under stirring at 100° C. for 120 minutes, thereby obtaining black particles. The thus obtained black particles were washed with water five times at intervals of 24 hours by decantation method, and then filtered through a filter paper #2. The recovered filter cake was dried at 80° C. for 12 hours using a constant temperature oven. Then, the resultant dried product was pulverized by a mortar, thereby fine black particles.

As a result of the elemental analysis, it was confirmed that the fine black particles had a composition represented by the formula: $(CoO)_{0.9}(NiO)_{0.1} \cdot 1.375Fe_2O_3$. In addition, as a result of the X-ray diffraction analysis, it was confirmed that the fine black particles had a spinel crystal structure, and as a result of observing the fine black particles by a transmission electron microscope (TEM), it was confirmed that the particles were monodisperse fine particles of cubic shape having an average particle diameter of about 25 nm.

Further, as a result of measuring magnetic properties of the fine black particles, it was confirmed that the coercive force HcJ thereof was 310 kA/m (3.9 kOe) and the saturation magnetization σs thereof was $58.8 \times 10^{-6}$ Wb.m/kg (46.8 emu/g). Further, it was confirmed that the obtained black fine particles are fine spinel-type ferrimagnetic particles of a single-phase crystal structure.

Examples 3 to 13

The same procedure as defined in Example 2 was conducted except that concentration of $Fe^{3+}$, amount of aqueous $Co^{2+}$ solution, amount of aqueous $Ni^{2+}$ solution, amount of aqueous sodium hydroxide solution, and pH value of precipitated slurry were changed variously, thereby obtaining fine spinel-type ferrimagnetic particles having a single-phase crystal structure.

Essential production conditions are shown in Table 1, and various properties of the obtained fine spinel-type ferrimagnetic particles are shown in Table 2.

TABLE 1

Production of fine spinel-type ferrimagnetic particles

| Examples | $Fe^{3+}$ concentration (mol/liter) | Amount of aqueous $Fe^{3+}$ solution (ml) | $Co^{2+}$ concentration (mol/liter) | Amount of aqueous $Co^{2+}$ solution (ml) | $Ni^{2+}$ concentration (mol/liter) | Amount of aqueous $Ni^{2+}$ solution (ml) | Fe/(Co + Ni) (molar ratio) | Amount of mixed solution (ml) | Concentration of sodium hydroxide (mol/liter) | Amount of aqueous sodium hydroxide solution (ml) | pH of precipitated slurry (-) | Amount of precipitated slurry (ml) | Heat-treatment of precipitated slurry Temperature (°C.) | Time (min) |
|---|---|---|---|---|---|---|---|---|---|---|---|---|---|---|
| Example 2 | 0.275 | 200 | 0.1 | 180 | 0.1 | 20 | 2.75 | 400 | 3 | 250 | 13.3 | 650 | 100 | 120 |
| Example 3 | 0.275 | 200 | 0.1 | 160 | 0.1 | 40 | 2.75 | 400 | 3 | 250 | 13.3 | 650 | 100 | 120 |
| Example 4 | 0.275 | 200 | 0.1 | 140 | 0.1 | 60 | 2.75 | 400 | 3 | 250 | 13.3 | 650 | 100 | 120 |
| Example 5 | 0.25 | 200 | 0.1 | 120 | 0.1 | 80 | 2.5 | 400 | 3 | 250 | 13.3 | 650 | 100 | 120 |
| Example 6 | 0.25 | 200 | 0.1 | 180 | 0.1 | 20 | 2.5 | 400 | 3 | 250 | 13.3 | 650 | 100 | 120 |
| Example 7 | 0.225 | 200 | 0.1 | 160 | 0.1 | 40 | 2.25 | 400 | 3 | 250 | 13.3 | 650 | 100 | 120 |
| Example 8 | 0.225 | 200 | 0.1 | 140 | 0.1 | 60 | 2.25 | 400 | 3 | 250 | 13.3 | 650 | 100 | 120 |
| Example 9 | 0.25 | 200 | 0.1 | 160 | 0.1 | 40 | 2.5 | 400 | 3 | 250 | 13.3 | 650 | 100 | 120 |
| Example 10 | 0.225 | 200 | 0.1 | 120 | 0.1 | 80 | 2.25 | 400 | 3 | 250 | 13.3 | 650 | 100 | 120 |
| Example 11 | 0.25 | 200 | 0.1 | 140 | 0.1 | 60 | 2.5 | 400 | 3 | 250 | 13.3 | 650 | 100 | 120 |
| Example 12 | 0.275 | 200 | 0.1 | 120 | 0.1 | 80 | 2.75 | 400 | 3 | 250 | 13.3 | 650 | 100 | 120 |
| Example 13 | 0.25 | 200 | 0.1 | 120 | 0.1 | 100 | 2.5 | 400 | 3 | 150 | 13.0 | 550 | 100 | 120 |

TABLE 2

Properties of fine spinel-type ferrimagnetic particles

| Examples | Compositional formula n | x | y | Crystal structure | Average particle diameter (nm) | Particle shape | Coercive force HcJ (kA/m) | Saturation magnetization (Wbm/kg) |
|---|---|---|---|---|---|---|---|---|
| Example 2 | 2.75 | 0.9 | 0.1 | Single phase/spinel crystal | 25 | monodisperse fine particles of cubic shape | 310 | $58.8 \times 10^{-6}$ |
| Example 3 | 2.75 | 0.8 | 0.2 | Single phase/spinel crystal | 30 | monodisperse fine particles of cubic shape | 382 | $53.9 \times 10^{-6}$ |
| Example 4 | 2.75 | 0.7 | 0.3 | Single phase/spinel crystal | 40 | monodisperse fine particles of cubic shape | 422 | $47.5 \times 10^{-6}$ |
| Example 5 | 2.5 | 0.6 | 0.4 | Single phase/spinel crystal | 50 | monodisperse fine particles of cubic shape | 517 | $52.4 \times 10^{-6}$ |
| Example 6 | 2.5 | 0.9 | 0.1 | Single phase/spinel crystal | 25 | monodisperse fine particles of cubic shape | 188 | $65.5 \times 10^{-6}$ |
| Example 7 | 2.25 | 0.8 | 0.2 | Single phase/spinel crystal | 40 | monodisperse fine particles of cubic shape | 286 | $71.1 \times 10^{-6}$ |
| Example 8 | 2.25 | 0.7 | 0.3 | Single phase/spinel crystal | 45 | monodisperse fine particles of cubic shape | 351 | $68.2 \times 10^{-6}$ |
| Example 9 | 2.5 | 0.8 | 0.2 | Single phase/spinel crystal | 30 | monodisperse fine particles of cubic shape | 274 | $63.7 \times 10^{-6}$ |
| Example 10 | 2.25 | 0.6 | 0.4 | Single phase/spinel crystal | 50 | monodisperse fine particles of cubic shape | 449 | $60.4 \times 10^{-6}$ |
| Example 11 | 2.5 | 0.7 | 0.3 | Single phase/spinel crystal | 40 | monodisperse fine particles of cubic shape | 380 | $56.9 \times 10^{-6}$ |
| Example 12 | 2.75 | 0.6 | 0.4 | Single phase/spinel crystal | 45 | monodisperse fine particles of cubic shape | 432 | $44.7 \times 10^{-6}$ |
| Example 13 | 2.5 | 0.5 | 0.5 | Single phase/spinel crystal | 30 | monodisperse fine particles of cubic shape | 438 | $51.0 \times 10^{-6}$ |

Figure 7:
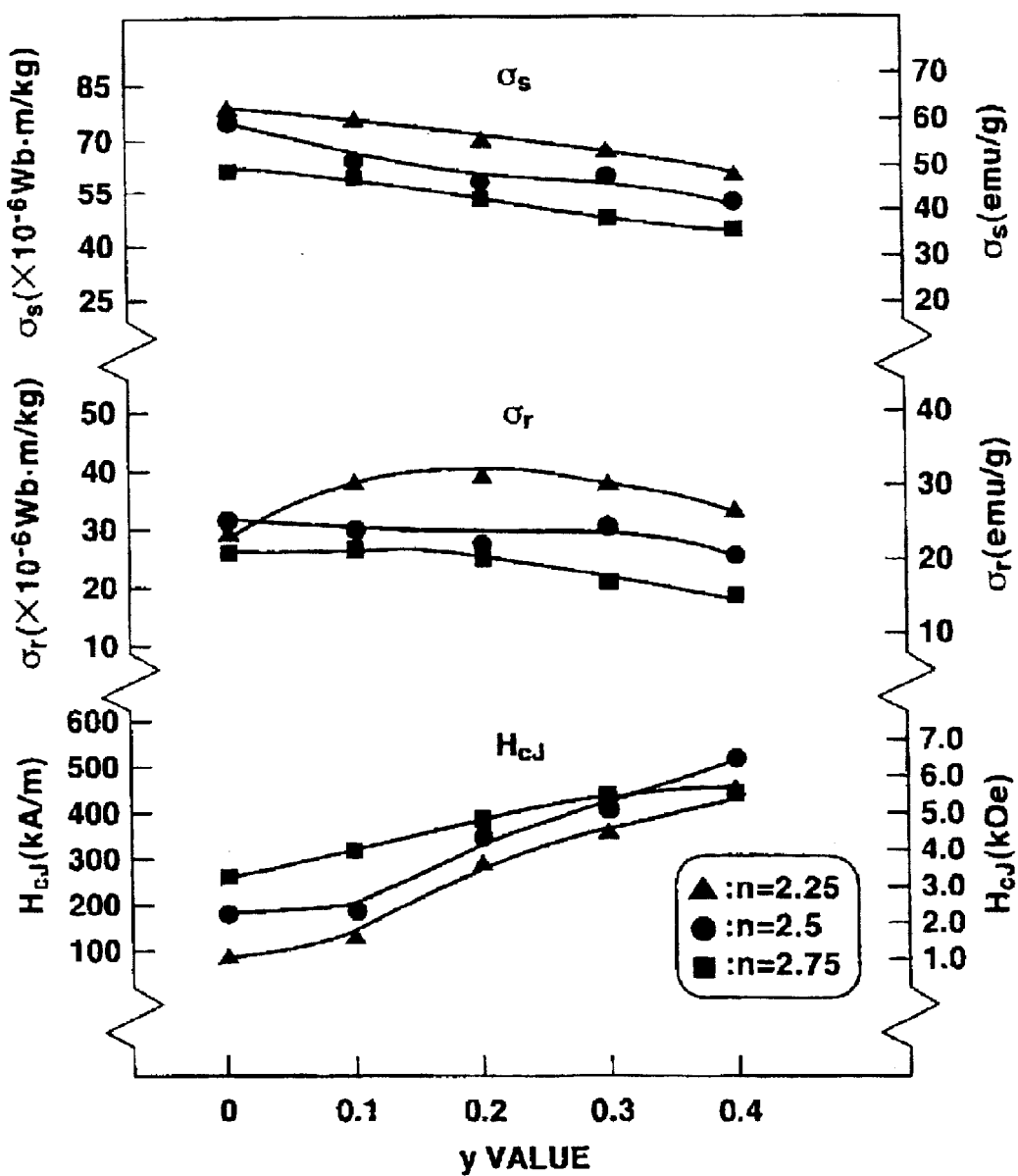
FIG. 7 is a graph showing magnetic properties of the particles having a composition represented by the formula: $(CoO)_x(NiO)_y \cdot n/2Fe_2O_3$, wherein n is 2.25, 2.5 or 2.75, when varying the molar ratio of Fe/(Co+Ni) in the range of $0.4 \geq y \geq 1$.

As is apparent from the above Examples 2 to 12, when the molar ratio (n) was varied over the range of from 2.25 to 2.75 in the compositions having a small amount of Ni, it was possible to obtain fine spinel-type ferrimagnetic particles as single phase particles having a high coercive force HcJ. The change in coercive force HcJ, etc. when varying not only the y value for the amount of Ni but also the molar ratio (n=Fe(Co+Ni)) is shown in FIG. 7. From FIG. 7, it was confirmed that in the case of the same composition having a small amount of Ni, i.e., under the condition of $0.4 \geq y \geq 1$, the higher coercive force HcJ was attained by varying the molar ratio (n), in particular, when n is 2.75, such an effect became more remarkable. Accordingly, the smaller amount of Ni could achieve not only formation of finer particles, but also reduction of production costs thereof.

Examples 14 and 15 (Production of Magnetic Sheet)

One part by weight of vinyl chloride-based copolymer resin, 6.21 parts by weight of cyclohexane, 6.21 parts by weight of toluene and 2.59 parts by weight of methyl ethyl ketone (MEK) were mixed together to prepare a mixed solution.

Example 14

Four parts by weight of the obtained mixed solution was mixed with 1 part by weight of the fine spinel-type ferrimagnetic particles obtained in Example 1 and 8 parts by weight of glass beads having a diameter of about 0.3 mm. The resultant mixture was dispersed using a dispersing apparatus "Mixer Mill Model 8000-D" (manufactured by Spex Co., Ltd.) for 8 hours, thereby preparing a magnetic coating composition (solid content (magnetic particles plus resin): 25% by weight).

Example 15

Four parts by weight of the obtained mixed solution was mixed with 1 part by weight of the fine spinel-type ferrimagnetic particles obtained in Example 13 and 8 parts by weight of glass beads having a diameter of about 0.3 mm. The resultant mixture-was dispersed using a dispersing apparatus "Mixer Mill Model 8000-D" (manufactured by Spex Co., Ltd.) for 8 hours, thereby preparing a magnetic coating composition (solid content (magnetic particles plus resin): 25% by weight).

The thus obtained magnetic coating compositions were respectively uniformly applied onto a 15 µm-thick PET film using a doctor blade. Thereafter, the obtained coating film was immediately oriented in a magnetic field of 0.8 MA/m (10 kOe) and then dried, thereby obtaining magnetic sheets.

Magnetic properties of the thus obtained magnetic sheets were measured and evaluated by the following methods.

(1) The magnetization curve was measured by the above vibration sample magnetometer (VSM).

(2) After subjecting the torque curve measured by a torque magnetometer to Fourier analysis, the magnetic anisotropy constants $K_1$ and $K_2$ were calculated from the following formula:

$$L = -(K_1/4 + K_2/64)\sin 2\theta - (3K_1/8 + K_2/16)\sin 4\theta + (3K_2/64)\sin 6\theta$$

Meanwhile, as to the above formula, reference should be made to the following literature:

Akinobu Chikakado et al., "Physics of Ferromagnetic Materials (II)" published by SHOKABO, 1984, Chapter 12, p. 13

(3) The magnetic anisotropy magnetic field Ha was measured by a torque magnetometer.

Meanwhile, as to the measuring method of the magnetic anisotropy magnetic field Ha, reference should be made to the following literature:

I. S. Jacobs and F. E. Luborsky, "J. Appl. Phys.", vol. 28, pp. 467–473, 1957, and D. M. Paige, S. R. Hoon, B. K. Tanner and KO'Grady, "IEEE Trans. Magen.", vol. 20, pp. 1852–1854, 1984

(4) The demagnetization under pressurization was measured by the following method. That is, after a magnetic field of 1.6 MA/m (20 kOe) was applied to a sheet sample prior to pressurization, the residual magnetization Mro thereof was measured by a vibration sample magnetometer (VSM). Next, a static pressure was applied to the sheet sample using a hydraulic press for 60 seconds, and then the residual magnetization Mr was measured. The demagnetization under pressurization was obtained as Mr/Mro. As to the measuring method, reference should be made to the following literature:

Toshio Fukaya, Tosihiko Oguchi, Hajime Takeuchi, Shozo Hideyama and Hiroki Yokoyama, "Journal of Japan Institute of Applied Magnetics", vol. 10, p. 81, 1986

Figure 8:
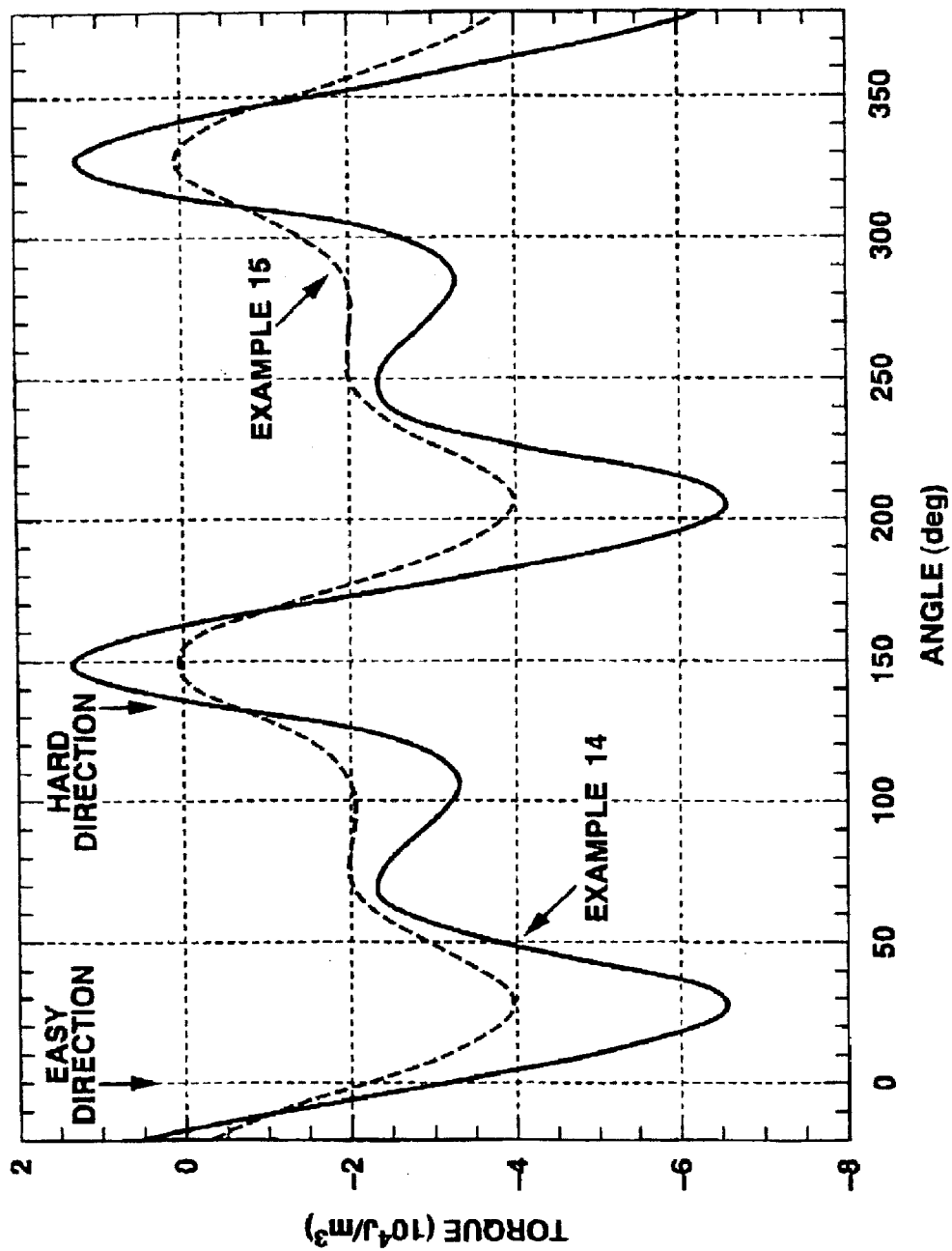
FIG. 8 is a graph showing torque curves of magnetic sheets obtained in Examples 14 and 15.
Figure 9:
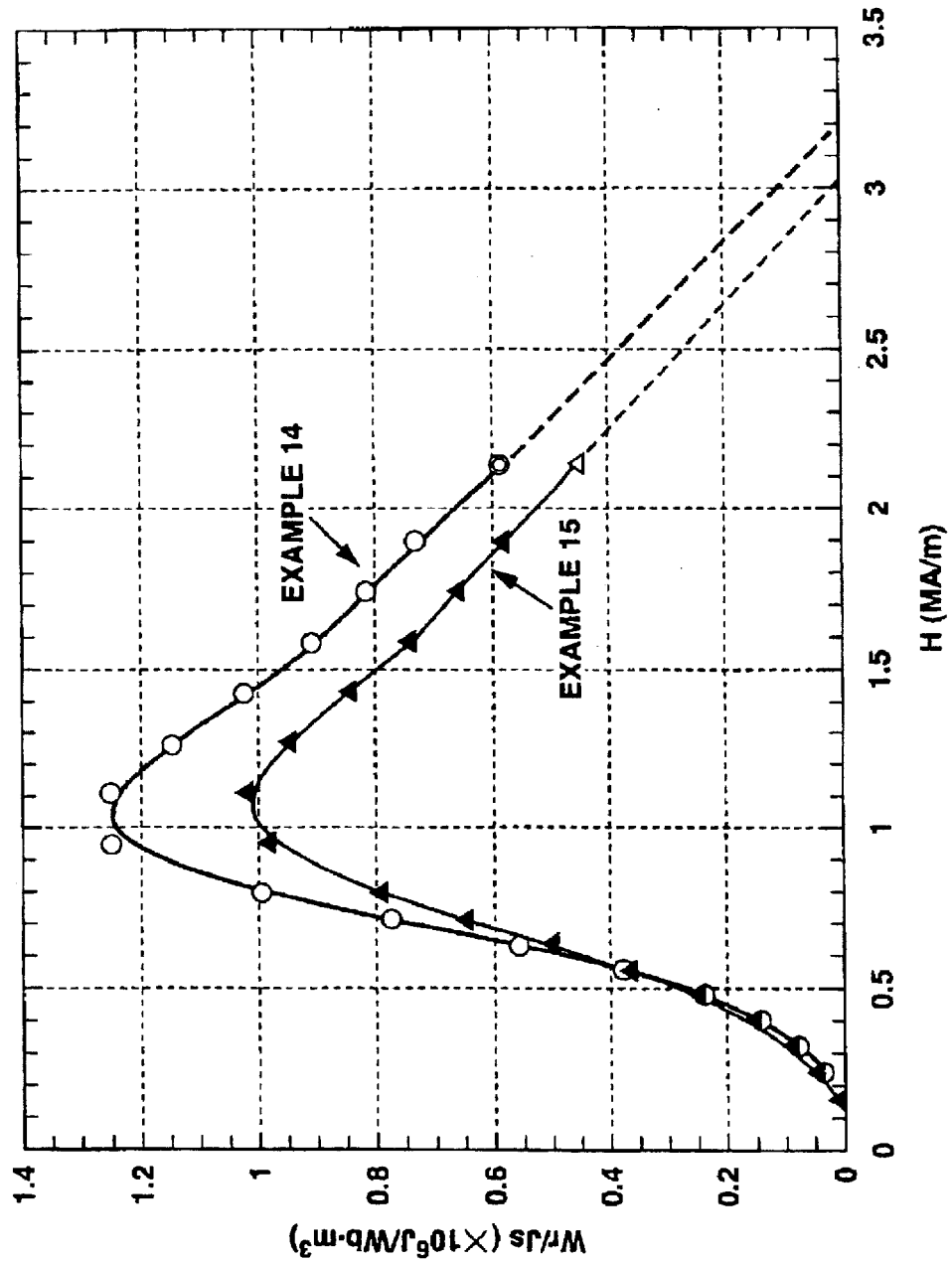
FIG. 9 is a graph showing the change in rotational hysteresis loss of the magnetic sheets obtained in Examples 14 and 15 relative to external magnetic field.
Figure 10:
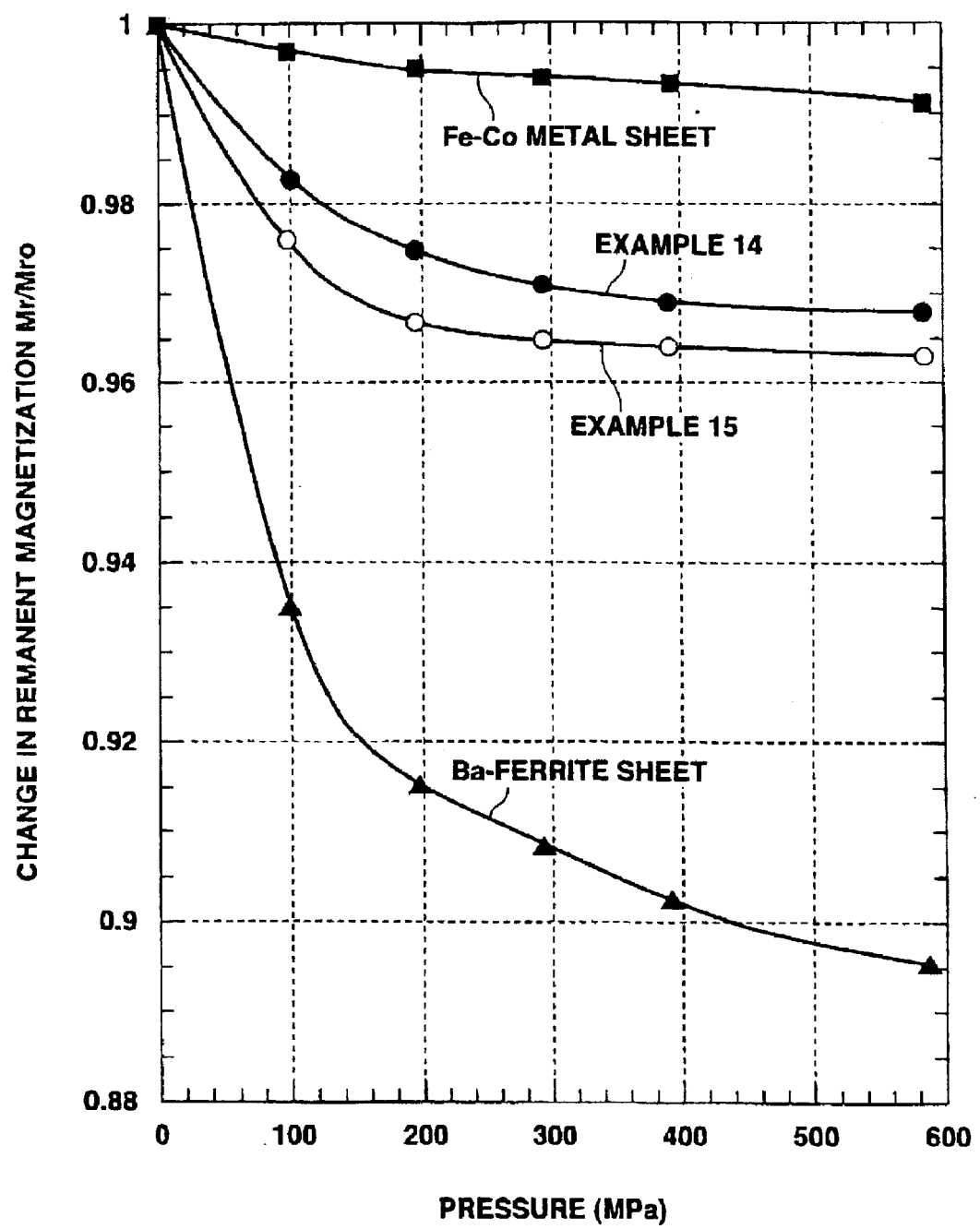
FIG. 10 is a graph showing demagnetization under pressurization (change in remanent magnetization) of the magnetic sheets obtained in Examples 14 and 15.

The magnetic anisotropy and demagnetization under pressurization as measured by the above methods are explained in detail by referring to FIGS. 8 to 10 wherein FIG. 8 shows a torque curve measured in a magnetic field of 2.15 MA/m, FIG. 9 shows a rotational hysteresis loss, and FIG. 10 shows a demagnetization under pressurization.

As shown in FIG. 8, the constants $K_1$ and $K_2$ were as follows: $K_1 \approx 1 \times 10^5$ J/cm$^3$ and $K_2 \approx 1 \times 10^5$ J/cm$^3$. As shown in FIG. 9, the rotational hysteresis loss was evaluated by plotting Wr/Js which was the value corresponding to the rotational hysteresis loss on an ordinate and plotting an external magnetic field H on an abscissa. As a result, it was confirmed that the anisotropic magnetic field Ha was about 2.79 to 3.18 MA/m, and the magnetic sheet obtained by using the fine spinel-type ferrimagnetic particles of the present invention showed a high magnetic anisotropy.

Further, as shown in FIG. 10, the magnetic sheets obtained by using the fine spinel-type ferrimagnetic particles of the present invention as well as other magnetic sheets obtained by using particles having different compositions (for example, magnetic sheets made of Ba ferrite or Fe—Co) were measured for determining demagnetization under static pressurization. As a result, it was confirmed that the magnetic sheets obtained by using the fine spinel-type ferrimagnetic particles of the present invention exhibited a smaller demagnetization under pressurization. Although the fine spinel-type ferrimagnetic particles of the present invention are of a cubic system and do not show monoaxial anisotropy, it is considered that since the magnetic anisotropic energy is sufficiently larger than the magnetostrictive energy due to pressurization, the demagnetization under pressurization is unlikely to occur. As a result, the fine spinel-type ferrimagnetic particles of the present invention can exhibit excellent magnetic properties.

What is claimed is:

1. Fine spinel-type ferrimagnetic particles having a composition represented by the formula (I):

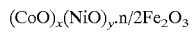

$$(CoO)_x(NiO)_y \cdot n/2 Fe_2O_3$$

wherein $2.0 < n < 3.0$, $0.4 \leq x \leq 0.9$, $0.1 \leq y \leq 0/6$, and $x+y=1$, and n=Fe/(Co+Ni).

2. Fine spinel-type ferrimagnetic particles according to claim 1, wherein n is from not less than 2.25 to less than <3.0.

3. Fine spinel-type ferrimagnetic particles according to claim 1, wherein n is 2.25 to 2.75.

4. Fine spinel-type ferrimagnetic particles according to claim 1, wherein x is 0.5 and y is 0.5.

5. Fine spinel-type ferrimagnetic particles according to claim 1, wherein y is 0.4 to 0.1.

6. Fine spinel-type ferrimagnetic particles according to claim 1, which comprise single-phase structure, and have a particle diameter of 10 to 50 nm, a saturation magnetization σs of $50.3 \times 10^{-6}$ to $88.0 \times 10^{-6}$ Wb.m/kg and a coercive force HcJ of 239 to 637 kA/m.

7. Fine spinel-type ferrimagnetic particles according to claim 5, wherein the particle diameter is 20 to 40 nm.

8. Fine spinel-type ferrimagnetic particles according to claim 5, wherein the coercive force HcJ is 279 to 637 kA/m.

9. Fine spinel-type ferrimagnetic particles having a composition represented by the formula (I):

wherein $2.0 < n < 3.0$, $0.4 \leq x \leq 0.9$, $0.1 \leq y \leq 0/6$, and $x+y=1$, and $n=Fe/(Co+Ni)$, and having a particle diameter of 20 to 40 nm, a saturation magnetization σs of $50.3 \times 10^{-6}$ to $88.0 \times 10^{-6}$ Wb.m/kg and a coercive force HcJ of 279 to 637 kA/m.

10. Fine spinel-type ferrimagnetic particles comprising single-phase structure, comprising iron, cobalt and nickel, the ratio of an iron mole to the sum of a cobalt mole and a nickel mole being from more than 2.0 to less than 3.0, and having a particle diameter of 10 to 50 nm, a saturation magnetization σs of $50.3 \times 10^{-6}$ to $88.0 \times 10^{-6}$ Wb.m/kg and a coercive force HcJ of 239 to 637 kA/m.

11. A process for producing fine spinel-type ferrimagnetic particles, comprising:

(1) mixing aqueous solutions containing $Fe^{3+}$, $Co^{2+}$ and $Ni^{2+}$ with each other, which are prepared by dissolving each of water-soluble salts of iron, cobalt and nickel in water, at such ratio of an Fe mole to the sum of a Co mole and a Ni mole being from more than 2.0 to less than 3.0 and the Co mole to the Ni mole being 0.4 to 0.9/0.6 to 0.1, (2) while stirring the resultant mixed solution, adding thereto an aqueous alkali solution in a range of from not less than one equivalent based on whole metal ion contained in the mixed solution to an amount such that the concentration of OH groups contained in a solution obtained after adding the aqueous alkali solution is not more than 3 mol/liter; and (3) heating the resultant precipitated slurry at a temperature of 80 to 101° C. while stirring.

12. Fine spinel-type ferrimagnetic particles having a composition represented by the formula (I):

wherein $2.0 < n < 3.0$, $0.4 \leq x \leq 0.9$, $0.1 \leq y \leq 0/6$, and $x+y=1$, and $n=Fe/(Co+Ni)$, produced by the process as defined in claim 10.

13. A magnetic sheet comprising fine spinel-type ferrimagnetic particles as defined in claim 1, and a binder resin.

* * * * *